United States Patent
Puntigam et al.

(10) Patent No.: US 11,592,278 B2
(45) Date of Patent: Feb. 28, 2023

(54) METHOD AND APPARATUS FOR DETERMINING A RELATIVE POSITION OF AN AXIS OF ROTATION OF A ROTARY TABLE FOR A COORDINATE MEASURING MACHINE

(71) Applicant: Carl Zeiss Industrielle Messtechnik GmbH, Oberkochen (DE)

(72) Inventors: Walter Puntigam, Heidenheim (DE); Niko Maier, Reimlingen (DE); Mark Herter, Essingen (DE); Rainer Sagemüller, Aalen (DE); Kai Schäffauer, Munich (DE); Ralf Bernhardt, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 326 days.

(21) Appl. No.: 16/906,638

(22) Filed: Jun. 19, 2020

(65) Prior Publication Data

US 2021/0010791 A1 Jan. 14, 2021

(30) Foreign Application Priority Data

Jun. 19, 2019 (DE) ...................... 10 2019 208 946.1

(51) Int. Cl.
*G01B 5/008* (2006.01)
*G01B 5/00* (2006.01)
(Continued)

(52) U.S. Cl.
CPC ........... *G01B 5/0004* (2013.01); *G01B 5/008* (2013.01); *G01B 11/14* (2013.01); *G01B 11/005* (2013.01)

(58) Field of Classification Search
None
See application file for complete search history.

(56) References Cited

U.S. PATENT DOCUMENTS 3,400,463 A * 9/1968 Barringer ................. G01B 7/34
33/554
4,369,581 A 1/1983 Lenz
(Continued)

FOREIGN PATENT DOCUMENTS

DE 29 40 633 A1 4/1981
DE 36 37 410 A1 5/1988
(Continued)

OTHER PUBLICATIONS

IBS Precision Engineering: http://ibspe.com/category/machine-toolinspection-and-analyzer-solutions/rotaryanalyzer.htm; retrieved Mar. 28, 2019; 2 pages.

*Primary Examiner* — Christopher W Fulton
(74) *Attorney, Agent, or Firm* — Miller Johnson (57) ABSTRACT

A method is described for determining a relative position of an axis of rotation of a rotary table of a coordinate measuring machine. The rotary table has or forms a reference element that is arranged eccentrically in relation to the axis of rotation. The method includes a measuring step including performing a rotary movement of the rotary table, and producing measuring points that encode a position of the reference element by a sensor of the coordinate measuring machine during the rotary movement. The method includes a determining step including determining the relative position of the axis of rotation of the rotary table based on the measuring points.

25 Claims, 3 Drawing Sheets

(51) Int. Cl.
*G01B 11/14* (2006.01)
*G01B 11/00* (2006.01)

(56) References Cited

U.S. PATENT DOCUMENTS

| | | | | |
|---|---|---|---|---|
| 4,819,339 | A | | 4/1989 | Kunzmann et al. |
| 5,359,784 | A | * | 11/1994 | Tomida .................. G01B 5/252 |
| | | | | 33/645 |
| 5,724,264 | A | * | 3/1998 | Rosenberg ........... G01B 21/042 |
| | | | | 700/161 |
| 5,926,781 | A | * | 7/1999 | Scott ...................... G01B 21/20 |
| | | | | 702/167 |
| 10,060,737 | B2 | * | 8/2018 | Bernhardt .............. G01B 21/04 |
| 10,145,682 | B2 | * | 12/2018 | Sagemueller ........ G01B 21/045 |
| 10,281,255 | B2 | * | 5/2019 | Seitz ...................... G01B 21/04 |
| 10,801,825 | B2 | * | 10/2020 | Sagemüller ............ G01B 5/008 |
| 10,852,122 | B2 | * | 12/2020 | Kern ....................... G01S 7/491 |
| 2011/0040523 | A1 | | 2/2011 | Matsushita |
| 2015/0052768 | A1 | | 2/2015 | Wimmer |
| 2015/0052770 | A1 | | 2/2015 | Noda et al. |

FOREIGN PATENT DOCUMENTS

| | | | |
|---|---|---|---|
| DE | 199 26 439 C1 | 12/2000 | |
| DE | 198 15 098 B4 | 7/2005 | |
| DE | 102010038783 A1 | 2/2011 | |
| DE | 102012207336 A1 | 11/2013 | |
| EP | 3287739 A1 * | 2/2018 | ............ G01B 21/00 |
| WO | WO-02090879 A2 | 11/2002 | |
| WO | WO-2013164344 A1 | 11/2013 | |
| WO | WO-2014122437 A1 * | 8/2014 | ............ G01B 21/04 |

* cited by examiner

METHOD AND APPARATUS FOR DETERMINING A RELATIVE POSITION OF AN AXIS OF ROTATION OF A ROTARY TABLE FOR A COORDINATE MEASURING MACHINE

CROSS-REFERENCE TO RELATED APPLICATIONS

This application claims priority to German Application No. 10 2019 208 946.1 filed Jun. 19, 2019. The entire disclosure of the application referenced above is incorporated by reference.

FIELD

The invention relates to industrial metrology and more particularly to coordinate measuring machines, including a method and an apparatus for determining a relative position of an axis of rotation of a rotary table of a coordinate measuring machine.

BACKGROUND

WO 2013/164344 A1 discloses a method for repeatedly determining the relative position of an axis of a rotary table in the machine coordinate system of a coordinate measuring machine. It describes probing a test body located on the rotary table in a number of positions of the rotary table by the measuring system of the coordinate measuring machine and determining the X coordinate and the Y coordinate of the axis of the rotary table in the machine coordinate system from the probe points. This only involves probing the test body at a standstill, therefore not during a rotary movement.

Something similar is described by the website "http://ibspe.com/category/machine-tool-inspection-and-analyzer-solutions/rotary-analyzer.htm", retrieved on Mar. 28, 2019, this website describing that the range of movement of the rotary table is passed through in incremental steps and in each step measuring points are produced. It is likewise assumed there that measuring points are only produced while a test body is at a standstill. The methods described there for determining a relative position of the axis of rotation are time-consuming.

WO 02/090879 A2 discloses a method for determining properties of a coordinate measuring machine and also a test object for it. The document discloses that it is important to know the relative position of the axis of rotation in the coordinate system of the base.

DE 198 15 098 B4 discloses a method for measuring rotary table deviations.

When measuring workpieces with a coordinate measuring machine, usually first a workpiece coordinate system is determined or established by so-called calibration. In the subsequent measurement of the workpiece, the coordinates of the measured values are however determined in the machine coordinate system, which is also referred to hereinafter as the inertial system. For the subsequent evaluation of test features, the measured values must then be transformed into the previously determined workpiece coordinate system. This allows for example the relative position (and orientation) of a bore, or the diameter of a bore, to be determined with reference to the workpiece coordinate system. These dimensions then usually have the reference indicated on the corresponding production drawing.

If a rotary table is used for holding the workpiece in a coordinate measuring machine, the measured values obtained in the inertial system must first be transformed into the rotary-table rotor coordinate system and subsequently into the workpiece coordinate system. For this purpose, it is required that the exact relative position of the rotary-table rotor coordinate system with respect to the inertial system is known.

For this reason, the relative position and orientation of the rotary table, which can be established by the position and orientation of the rotary table axis, is calibrated before measuring begins. This process is referred to as "calibration of the rotary table axis".

It is possible that the reference between the inertial system and the rotary table axis is not constant over time, for example on account of changing ambient conditions such as the temperature. It is also possible that the movement trajectories of the movable parts of the coordinate measuring machine change over time, whereby a calibrated reference between the rotary table axis and the inertial system may be lost.

It may therefore be desirable to calibrate the rotary table axis cyclically, for example at the beginning of each measuring sequence (test plan run). This gives rise to the following problems.

The calibration of the rotary table axis generally takes place by the previously explained probing of a reference element at a standstill, for example by the probing of a test sphere, generally with single-point probings. In particular, such single-point probings may be carried out here in 6 or more angular positions that are different from one another of the rotary table and consequently also of the test body. On account of the single-point probings and the required readjusting of the coordinate measuring machine in relation to the reference element, this procedure causes a relatively great expenditure of time.

In spite of this great expenditure of time, the number of measuring points generated is often low. This has the consequence that the calculated relative position of the rotary table coordinate system may be inexact.

In the case of a further commonly used method for calibrating the rotary table axis, a so-called reversal measurement is carried out on a cylinder. This generally requires complex, laterally projecting probe configurations, which in a time-consuming procedure have to be fitted and possibly calibrated. Often, the achievable accuracy is also reduced in the case of these probes, or, depending on the measuring head system that is used, greatly projecting probe configurations are not possible.

Furthermore, there is often the problem that, for calibrating the rotary table axis, a suitable reference element (generally a sphere or a cylinder) has to be arranged on the face plate of the rotary table. For this purpose, it may be required first to remove the workpiece from the face plate, whereby the expenditure of time is once again increased or the accuracy of the calibration of the rotary table axis is also reduced because the gravitational forces and moments caused by the workpiece may have an effect on the relative position of the rotary table axis.

SUMMARY

There is therefore the technical problem of providing a method and an apparatus for determining a relative position of an axis of rotation of a rotary table of a coordinate measuring machine and also a rotary table and a coordinate measuring machine that allow a determination of the relative position of the axis of rotation in a quick time and at the same time reliably and accurately.

The solution to the technical problem is provided by the subject matter with the features of the independent claims. Further advantageous configurations of the invention are evident from the subclaims.

A method for determining a relative position of an axis of rotation of a rotary table of a coordinate measuring machine is proposed. The rotary table may serve in particular for holding a measurement object to be measured, for example a workpiece. The rotary table may comprise a so-called face plate or be formed as such. If reference is made hereinafter to the rotary table, unless otherwise indicated, the corresponding statements can also refer to the face plate.

The reference element may in particular be arranged on an upper side of the rotary table. The rotary table allows this element to be rotated in the measuring volume of the coordinate measuring machine. This also allows the rotary table to be located in the measuring volume of the coordinate measuring machine.

The relative position may in this case refer to a position in space and/or an orientation in space. It is possible that the relative position is indicated in the form of a 4×4 matrix or by a position vector and a 3×3 orientation matrix or a spatial point and a, preferably normalized, orientation vector.

The coordinate measuring machine may in this case be a coordinate measuring machine of a so-called stand or gantry type of construction. It goes without saying that other coordinate measuring machines may also be used. The coordinate measuring machine may in particular allow the movement of a sensor for producing measuring points, in particular with a predetermined number of degrees of freedom of movement, for example with one, two or three translational degrees of freedom of movement and/or one, two or three rotational degrees of freedom of movement. For this purpose, the coordinate measuring machine may comprise correspondingly formed drive devices and/or movement guiding means.

The rotary table has at least one reference element or forms it. The reference element may also be arranged at or on the rotary table. It is for example conceivable that the reference element is detachably fastened to the rotary table. The reference element may in this case be arranged on an upper side of the rotary table, on/at an underside of the rotary table or at a lateral surface or side surface of the rotary table. The upper side or underside may in particular have an uncurved surface or at least an uncurved surface portion, which is formed as planar.

The reference element serves for producing measuring points, in that it can be probed or scanned by the sensor. Various configurations of the reference element are conceivable here. Thus, the reference element may for example be a reference element for tactile probing. The reference element may also be a reference element for optical scanning. Reference elements given by way of example are explained in still more detail below. The measuring points may represent a position of the reference element, in particular of surface points of the reference element, in a machine coordinate system.

The reference element is in this case arranged eccentrically in relation to the axis of rotation. This means that, during the rotation of the rotary table, the reference element performs a movement along a circular path.

In a measuring step, a rotary movement of the rotary table is performed.

The sensor may be in particular a tactile sensor. A tactile sensor may form a contacting measuring head system or be part thereof. In particular, a tactile sensor may comprise a probe, in particular a probe with a so-called probe ball. Alternatively, the sensor may be an optical sensor. This may form a contactless measuring head system or be a part thereof. A contactless measuring head system may be in particular an optical measuring head system.

That the reference element is arranged in the range of detection of the sensor may mean in particular that measuring points that encode points, in particular surface points, of the reference element, and in particular their coordinates in a machine coordinate system, can be produced by the sensor. In particular, coordinates of the measuring points may correspond to the coordinates of the surface points in the machine coordinate system.

According to the invention, measuring points may be produced by the sensor in the measuring step during the rotary movement, that is to say while the rotary table is in motion. The measuring points may in this case be produced when the sensor is not moving, that is to say is at a standstill. Preferably, however, measuring points may alternatively or additionally also be produced during a following movement still to be explained in more detail below.

Measuring points when the sensor is at a standstill may be produced for example as long as the reference element is in the range of detection of the sensor.

The measuring points are produced by probing or scanning the reference element, in particular by optical or tactile probing. That the measuring points are produced during the rotary movement means that measuring points are produced when a speed of the rotary table is not equal to zero. In particular, measuring points are consequently not only produced when the reference element is at a standstill. This means that measuring points are produced when a speed of movement, that is to say a rotational speed, of the rotary table is not equal to zero.

It is possible that the sensor is controlled by a movement controlled by the user in an open-loop manner in such a way that the reference element is moved into the range of detection of the sensor or remains in it. This may also be referred to as manual positioning. Such manual positioning may be carried out in particular before the production of measuring points when the sensor is at a standstill or before a following movement. It is however also possible that the sensor is moved in an automated manner in such a way that the reference element is moved into the range of detection of the sensor or remains in it. This may also be referred to as automated positioning. Such automated positioning may take place in particular during a following movement.

In a determining step, the relative position of the axis of rotation of the rotary table is determined in dependence on the measuring points produced.

It is possible that the coordinates of a reference point of the reference element are determined in various rotational positions of the rotary table that the latter assumes during the rotary movement, for example a midpoint. This reference point may be arranged in a fixed place in relation to the reference element. This allows the reference element to be formed in particular in such a way that a reference point of the reference element can be probed/scanned repeatedly and definitely.

Thus, for example, the measuring points in each rotational position of the rotary table may represent the same reference point of the reference element, i.e. the same reference point may be probed/scanned in each rotational position. Alternatively, in each rotational position, a reference point of the reference element, in particular its position, may be determined in dependence on the measuring points produced.

The measuring points or reference points produced/determined during the rotary movement in this case ideally lie on a circular path, in particular the circular path on which the reference point of the reference element moves during the rotary movement of the rotary table.

In dependence on the coordinates of these measuring or reference points in the machine coordinate system, a midpoint of this circular path can then be determined, in particular by means of a correspondingly formed control and evaluation device.

This midpoint may be a supporting point of the axis of rotation of the rotary table. This supporting point may be determined as the position of the axis of rotation. Furthermore, a plane in which the circular path runs or a plane which minimizes a deviation between the coordinates of the measuring or reference points and the plane may be determined. A vector that is oriented perpendicularly to this plane establishes a spatial orientation of the axis of rotation in the machine coordinate system. Consequently, a position and an orientation, that is to say a relative position, of the axis of rotation can be determined. For example, properties of a circle may be determined in such a way that a distance of the measuring points produced from the circle, in particular the circular path, is minimal. This may also be referred to as circle fitting. Then the midpoint explained and the plane explained can be determined for the circle determined in such a way.

This advantageously has the effect that the rotary table with the reference element does not have to be stopped in order to produce measuring points that are then evaluated for determining the relative position of the axis of rotation. Rather, measuring points for determining the relative position of the axis of rotation may be produced already during the rotary movement of the reference element, whereby the time period for determining the relative position of the axis of rotation, in particular for producing the measuring points required for this, is significantly shortened in comparison with the prior art explained. In other words, measuring points are produced in a so-called scanning operating mode and not by single-point probings. To sum up, this advantageously results in a determination of the relative position of the axis of rotation of the rotary table in a quick time, reliably and accurately. It likewise advantageously has the effect that a large set of measuring points can be produced, which further improves the determination of the relative position. It also advantageously has the effect that the method can be carried out both with sensors that cannot produce a probing or clamping force and with sensors that can actively or passively produce a probing or clamping force. The production of a probing or clamping force is explained in still more detail below.

In a further embodiment, a following movement of a sensor of the coordinate measuring machine is performed during the rotary movement, that is to say at the same time as it. The following movement may in this case be performed in particular in such a way that the at least one reference element is arranged in the range of detection of the sensor during the rotary movement.

The following movement may in this case likewise be a movement along a circular path, wherein parameters of this circular path movement, that is to say for example a midpoint and/or a radius, deviate by no more than a predetermined amount from the intended circular path on which the reference element moves during a rotation of the rotary table. However, it is not imperative that the trajectory of the following movement is in the form of a circular path. It is also conceivable that the following movement is substantially in the form of a circular path or approximates to a movement in the form of a circular path or is carried out in such a way that a distance between a movement trajectory in the form of a circular path and the trajectory of the following movement is less than a predetermined amount.

Furthermore, measuring points may be produced by the sensor in the measuring step during the following movement, that is to say while the sensor is in motion.

That the measuring points are produced during the following movement means that measuring points are produced when a speed of the sensor is not equal to zero. This may also be referred to as the so-called scanning operating mode of the sensor or of the coordinate measuring machine. In particular, measuring points are consequently not only produced when the sensor is at a standstill.

During the following movement, in particular a tactile probing sensor may be moved by a suitable open-loop or closed-loop control system in particular in such a way that a probing state is set during the following movement, that is to say a probing element of the sensor probes the reference element. This may take place by the previously explained automated positioning.

In other words, it is therefore possible that measuring points are produced by the sensor when both the rotary movement of the rotary table and the following movement of the sensor are being performed.

The performance of the following movement may in particular be begun when the reference element leaves the range of detection of a previously unmoved sensor.

It is consequently possible that measuring points are first produced during a rotary movement of the rotary table, the sensor not being moved, while subsequently measuring points are produced during the following movement.

The following movement may in this case be carried out in such a way that the sensor is moved along the movement trajectory of the following movement at the same speed as the reference element is moved along the circular path trajectory. The speed of the following movement may be determined in particular in dependence on the rotational speed of the rotary table and also the relative position of the reference element in the rotary table coordinate system in relation to the axis of rotation, wherein the rotational speed may be already known, or may be detected, in particular detected in a sensor-based manner. The relative position of the reference element may also in this case be already known or be detected/determined.

The measuring points or reference points produced/determined during the rotary and/or following movement in this case ideally lie on a circular path, in particular the circular path on which the reference point of the reference element moves during the rotary movement of the rotary table.

In other words, measuring points are produced in a so-called scanning operating mode and not by single-point probings. This advantageously has the effect that a larger set of measuring points can be produced, which further improves the determination of the relative position.

In a further embodiment, at least part of the rotary movement and part of the following movement are performed at the same time. Thus, it is possible for example that, during a performed rotary movement, the following movement is only performed when the rotary movement causes the reference element to reach a boundary of the range of detection or to leave the range of detection, in particular in the case of optical sensors for producing measuring points, wherein a following movement is not performed before the range of detection is left or before the boundary is reached. It is also possible that no rotary movement is performed when a following movement is performed. Preferably, however, the rotary movement and the following movement are performed at the same time. Also preferably, measuring points are produced when the rotary movement and the following movement are performed at the same time.

This advantageously results in a particularly reliable determination of the relative position of the axis of rotation, since the simultaneous performance reduces the risk of the reference element moving out of the range of detection of the sensor, and consequently the measuring points not being produced.

In a further embodiment, the movement trajectory of the following movement is determined in dependence on an approximate relative position of the axis of rotation. The approximate relative position may in this case be an already known, in particular predetermined, relative position of the axis of rotation. As explained in still more detail below, the approximate relative position may also be determined in an approximate relative position determining step before carrying out the measuring step. In particular, the approximate relative position is not determined in dependence on the measuring points produced during the rotary and/or following movement carried out in the measuring step.

In dependence on the approximate relative position known in such a way and the, in particular already known, arrangement of the reference element in the rotary table coordinate system, that is to say in relation to the axis of rotation, properties of the movement trajectory of the following movement, for example a radius and a midpoint of this trajectory, can then be established.

When they are established in such a way, it can be assumed that during the rotary movement of the rotary table the reference element does not move out of the range of detection of the sensor moved with the following movement, or the corresponding risk is minimized. In particular, the production of as many measuring points as possible during the following movement can in this way be ensured, whereby the accuracy and reliability of the proposed method is advantageously improved.

Alternatively or additionally, the movement trajectory of the following movement may be determined in dependence on measuring points that have been produced during the rotary movement of the rotary table.

In particular, the movement trajectory of the following movement may be determined in dependence on measuring points that are produced when the sensor is not moved, that is to say is at a standstill and does not perform any following movement. As previously explained, these measuring points likewise lie on a circular path. This allows it to be possible to determine the properties of the circular path, and consequently also the movement trajectory of the following movement, from few measuring points.

However, it is also possible to determine the movement trajectory of the future following movement in dependence on measuring points that are produced when the sensor performs the following movement. In this case, the movement trajectory may be re-determined, or the determination improved.

This advantageously results in a simple and quick determination of the movement trajectory of the following movement. The determination of the trajectory allows simplified automated positioning of the sensor.

In a further embodiment, in an approximate relative position determining step, probing/scanning of the rotary table is carried out with the sensor, wherein the approximate relative position is determined in dependence on the measuring points produced in the approximate relative position determining step. In particular, multiple measuring points may be produced, in particular by carrying out multiple probings/scannings of the rotary table.

Surface points of an end face of the rotary table may be probed/scanned. Measuring points may also be produced on an upper side and/or an underside of the rotary table.

In dependence on these measuring points, an approximate relative position of the axis of rotation and an approximate orientation of the axis of rotation can then be determined. For example, a plane of which the deviation from the measuring points produced on an upper side or an underside of the rotary table, in particular the face plate, is minimal can be determined, wherein the approximate orientation of the axis of rotation corresponds to the orientation of a vector oriented perpendicularly to this plane. Furthermore, in particular in dependence on the measuring points produced on/along an end face of the rotary table, which ideally lie on a circular path or a portion of a circular path, a midpoint of the circle which then corresponds to an approximate supporting point of the axis of rotation can be determined. The approximate relative position of the axis of rotation is then determined by the approximate supporting point and the approximate orientation.

This advantageously results in a determination that is easy to implement, and in particular can be realized without additional structural elements, of an approximate relative position of the axis of rotation, which can then be used for establishing the trajectory of the following movement. As previously explained, being established in a corresponding way reduces the risk of the reference element being moved out of the range of detection of the sensor, and consequently the risk of no measuring points or defective measuring points being produced.

It is also possible that the position of the reference element is determined in the inertial system, in particular by probing of the reference element. The previously explained determination of the approximate relative position and approximate orientation of the axis of rotation then also allows an approximate relative position of the reference element to be determined in the rotary-table rotor coordinate system. This advantageously allows simplified probing of the reference element during a rotary movement of the rotary table. In particular, with a known approximate relative position of the reference element in the rotary-table rotor coordinate system and with known properties of the rotary movement of the rotary table, for example an angle of rotation, an angular velocity and/or an angular acceleration, an approximate relative position of the reference element can also be determined in the inertial system during the rotary movement of the rotary table. Properties of the rotary movement may be determined for example by corresponding measuring systems, in particular incremental or absolute angle measuring systems, for example in dependence on their output signals. In the case of incremental measuring systems, which are for example used for angle measurement in the case of rotary tables fastened mechanically rigidly to a measuring table, it may be required to carry out a reference run before the approximate relative position of the reference element is determined in the inertial system. In the reference run, the rotary table may be moved into a predetermined reference position, wherein the subsequent determination of the properties of the rotary movement is referred to this reference position.

This can simplify the open-loop movement control or the closed-loop control for carrying out the following movement or for the probing during the following movement. Thus, the reference element may in particular be found in an automated manner. For example, a pre-control may take place in dependence on the approximate relative position of the reference element in the inertial system. Also, the previously explained automated positioning of the sensor can be simplified. It is also possible that the number of manual positionings explained is reduced.

In a further embodiment, the following movement is an open-loop controlled movement. Alternatively, the following movement is a closed-loop controlled movement. In the case of an open-loop controlled movement, the determination of the manipulated variable necessary for performing the following movement, for example an input variable for a drive device for producing the following movement, takes place without feedback of a measured (movement) variable, that is to say without determination of a system deviation. In the case of an open-loop controlled movement, it may be controlled for example in dependence on a rotational speed of the rotary table and the previously explained relative position between the reference element and the axis of rotation. In the case of an open-loop controlled movement, a way of carrying out the method that can be easily implemented in computational terms and requires less computing effort is advantageously obtained.

In the case of a closed-loop controlled movement, the detection of a (movement) variable and the formation of a system deviation takes place, wherein the manipulated variable is then determined in dependence on the system deviation, in particular in such a way that the following movement is performed in such a way that the system deviation is minimized.

The fed-back variable may be in particular a deviation of the probed/scanned reference point from an intended relative position in the sensor coordinate system, for example a position of the reference point on an optical axis of an optical sensor that is used. The intended relative position may also be an undeflected relative position of a tactile sensor. If, for example, a tactile sensor with a deflectable probe is used for producing measuring points, the system deviation may be for example the amount of the deflection, that is to say the deviation from an undeflected relative position of the probe. In other words, the movement of the sensor may take place in such a way that the deflection is minimized. In this case, the sensor "follows" the deflection.

In the case of a closed-loop controlled movement, a way of minimizing the risk that the reference element moves out of the range of detection of the sensor during the rotary movement is advantageously obtained, whereby the reliability of the production of measuring points is increased.

In a further embodiment, the reference element is a tactile reference element, wherein a probing position of a tactile sensor is definitely established by the formation of the tactile reference element. A tactile reference element may also be referred to as a reference element that can be probed in a tactile manner. This may mean in particular that the tactile reference element is formed in such a way that, in particular with a specific tactile sensor, a reference point of the reference element can be probed repeatedly and definitely. The reference point may in this case be different for different tactile sensors, in particular for different diameters of probe balls.

Preferably, but not necessarily exclusively, such a tactile reference element is a so-called self-centering reference element. This may mean that, when probing the tactile reference element, in particular along a predetermined probing direction, a tactile sensor is moved into a definitely established probing position, in particular to a definitely established probing point (reference point). Once this probing point has been reached, a further movement in the probing direction is prevented by the formation of the tactile reference element. Movement in directions different from the probing direction may also be prevented by the formation of the reference element, though at least movement counter to the probing direction is enabled.

A self-centering reference element may for example comprise a so-called roller triplet or a ball triplet.

This advantageously results in a great reliability and accuracy in the production of measuring points during the following movement, whereby the determination of the relative position of the axis of rotation can also take place more reliably and accurately.

In a further embodiment, the sensor is a tactile sensor. Furthermore, a force can be produced by means of the sensor, while no force is produced in the directions different from the intended probing direction, in particular during the following movement. It is also possible that a force different from zero is produced in the intended probing direction. This allows the reliability that the tactile sensor probes the same reference point in each probing operation to be increased.

A force that can be produced by the sensor may be a probing force or a clamping force. This force may be exerted by the sensor for example on the measurement object. However, the force may also be produced by the sensor and be exerted on a movable part of the sensor, for example a movable part with the probe ball.

A clamping force may refer to a force that is produced when a probe of the tactile sensor is deflected from a predetermined relative position, for example the undeflected relative position, wherein the force is produced in such a way that it counteracts the deflection. In illustrative terms, the probe may be clamped in the predetermined relative position.

A probing force may refer to a force that is produced by the probe and is oriented in the direction of the normal to the surface probed at the probing point and also away from the surface. The probing direction refers here to a direction in which the probe is moved toward the probing point on the surface to be probed before the probing, that is to say before mechanical contact.

In the case of tactile probing, the probing direction does not necessarily correspond to the direction of the probing force. By the probing or during the probing, the probe is deflected in the direction of the surface normal to the probed surface at the probing point. The probing force is then produced counter to this direction, and consequently does not necessarily correspond to the probing direction.

A probing force or clamping force may be actively produced, for example by an actuator. Alternatively or additionally, such a force may also be passively produced, for example by a spring element, for example a pretensioned spring element. In this case, the spring force may form the force or part thereof. Also alternatively or additionally, a gravitational force may also form the force or part thereof.

It is possible that a force, in particular the force produced by an actuator, is only produced or can only be produced in one predetermined direction or in multiple predetermined directions, but not in all spatial directions. In this case, no force can be produced in the at least one remaining spatial direction, which can consequently therefore be a "force-free" spatial direction.

The intended probing direction may in particular be oriented parallel to a central middle line or longitudinal axis of the probe in the undeflected state and be oriented away from a probe tip. This advantageously results in the tactile sensor also being able to be deflected easily when probing the reference element during the following movement, since no force counter to this deflection or only a force caused by gravitational and/or spring forces is produced.

This in turn means that it can be ensured that the reference element is reliably and permanently in the range of detection of the tactile sensor. This allows for example easy, accurate and reliable probing of a reference element. It goes without saying that, in the deflected state of the probe, the coordinate of the measuring point correspondingly produced in the deflected state can be determined in dependence on the deflection. For this purpose, the deflection may be quantitatively detected.

Alternatively, a force can be produced or such a force is produced by means of the sensor, while a force different from zero can be produced in a tangential direction of the trajectory of the following movement. The tangential direction may in this case be a tangential direction to a circle at the current measuring point, wherein a circular line of the circle runs through the current measuring point of the sensor and has for example the previously determined properties, for example properties determined in the approximate relative position determining step, such as the midpoint and radius.

Furthermore, it is also possible in this embodiment that a force different from zero is produced in the intended probing direction.

This advantageously allows reliable probing of a circular or arcuate groove as a reference element, which is explained in still more detail later. In this case, no probing force can be additionally produced in the directions different from the tangential direction of the trajectory (apart from possibly the probing direction).

The force different from zero can be produced in a tangential direction of the trajectory of the following movement in particular when a probe of the tactile sensor is deflected at least proportionately in this direction, wherein the force then acts counter to this deflection, that is to say corresponds to the previously explained clamping force. In this way it can then be advantageously ensured that the probe follows as reliably as possible the circular (arcuate) groove as a reference element during the following movement. This then advantageously results overall in a reliable and accurate production of measuring points.

In a further embodiment, the rotary movement does not cause a full revolution of the rotary table. Consequently, the trajectory of the reference element covered during the rotary movement is in the form of an arc of a circle. A midpoint angle assigned to this arcuate trajectory may for example lie in a range from 0° (exclusive) to 360° (exclusive), preferably in the range from 200° (inclusive) to 250° (inclusive), since this allows a determination of the relative position that is as accurate and reliable as possible with fewest possible measuring points.

This advantageously results in a determination of the relative position of the axis of rotation in a quick time, since a full revolution does not have to be completed. Furthermore, it may also be sufficient for the determination of the relative position that only measuring points along part of the circular path have been produced, since even then the previously explained plane and the midpoint can be determined.

Alternatively, the rotary movement causes exactly one or more than one full revolution of the rotary table. In this case, during the movement of the rotary table, the reference element is moved along a complete circular path.

If more than one full revolution is performed, the reference element is moved multiple times through at least one portion of this circular path. In this case, measuring points can be produced multiple times in the same portion of the circular path, whereby a redundancy in the detection of measuring points can be produced and the accuracy in the determination of the relative position of the axis of rotation can be improved. In particular, this allows a reduction of so-called asynchronous error components in the determination, resulting for example from movement errors of the rotary table caused by rotary bearings and/or from frictional effects.

If exactly one revolution is completed, this advantageously achieves the effect that a determination of the relative position of the axis of rotation that is as reliable as possible is ensured with the smallest possible expenditure of time.

In a further embodiment, a direction of rotation of the rotary movement is changed, wherein measuring points are produced during the rotary movement with a first direction of rotation and during a rotary movement with a second direction of rotation that is different from the first rotary movement. This advantageously results in it being possible to reduce error components caused by hysteresis, which are caused for example by friction in the probing of the reference element or in the sensor.

In a further embodiment, measuring points are only produced in predetermined portions of the rotary movement. These portions may have in particular a predetermined length. Also, a distance between two different portions may be greater than a predetermined minimum distance. The length may be given in particular in the form of a midpoint angle of the trajectory along which the reference element moves during a portion when measuring points are being produced. The distance may be given in particular in the form of a midpoint angle of the trajectory along which the reference element moves between two such portions, that is to say when no measuring points are being produced. A length may be established in particular by a midpoint angle of 30°. A distance may be established in particular by a midpoint angle of 90°. This advantageously results in a good compromise between accuracy and measuring time.

In a further embodiment, the number of measuring points produced in overlapping portions of the trajectory of the following movement is reduced. This is relevant in particular for the previously described embodiment in which more than one full revolution of the rotary table takes place. In particular, measuring points with the same coordinates or coordinates that deviate from one another by no more than a predetermined amount can be reduced, in that all but one measuring point of this previously described set of measuring points are canceled. Then only this non-canceled measuring point can be evaluated for determining the relative position. Preferably, measuring points of which the coordinates do not deviate from one another, or by no more than a predetermined amount, and which have been produced with rotational speeds that do not deviate from one another by more than a predetermined amount can be reduced, in that all but one measuring point of this previously described set of measuring points are canceled. Also, measuring points of which the coordinates do not deviate from one another, or by no more than a predetermined amount, and which have been produced with probe deflections that do not deviate from one another by more than a predetermined amount can be reduced, in that all but one measuring point of this previously described set of measuring points are canceled. Furthermore, such measuring points may be canceled if these measuring points have been produced during an acceleration phase.

This advantageously results in a reduction in memory requirement and the required computing power for determining the relative position of the axis of rotation. There is also advantageously the effect that measuring points that have been produced during an acceleration phase can be canceled, whereby the effect on the determination of the relative position of the axis of rotation of inaccuracies caused by the acceleration can be reduced.

In a further embodiment, the rotary movement is carried out in partial movements following one another in time, wherein the rotary movement is stopped at the end of each partial movement. In other words, the rotary movement is therefore divided in each case into sequentially carried-out partial movements.

Preferably, the rotary movement and the following movement are carried out in partial movements following one another in time, wherein the rotary movement and the following movement are stopped at the end of each partial movement.

In this case, a measuring point/measuring points may be produced for example when accelerating at the beginning of a partial movement and/or when braking at the end of a partial movement, wherein the sensor does not perform a movement or a following movement or no longer performs a following movement. In other words, a partial movement of the following movement may begin later than a partial movement of the rotary movement and/or end earlier than a partial movement of the rotary movement. This advantageously results in a set of the produced measuring points being increased, since times that are required for beginning the following movement or that lie after the ending of the following movement can also be used for producing measuring points.

In a further embodiment, measuring points are only produced when an amount of an acceleration of the following movement is less than a predetermined threshold value. In particular, measuring points can only be produced when the sensor is not accelerated or braked, or only to a slight extent, and consequently in particular is moved at a constant speed different from zero. This advantageously results in improved accuracy in the production of measuring points, since accelerations that may occur for example on account of the transition from static friction to sliding friction, on account of inertial forces, may reduce the accuracy in the production of measuring points by deformation of the sensor.

In a further embodiment, the rotary table has at least one further reference element, or forms it, or alternatively or additionally with respect to the first reference element at least one further reference element is arranged at the rotary table. That at least one further reference element is arranged at the rotary table may also mean that the relative position of the reference element in relation to the rotary table is changed. In particular, the reference element used in the first measuring step, which may also be referred to as the first reference element, can be detached from the rotary table and arranged on it again in a different relative position.

Then, in a further measuring step a further rotary movement of the rotary table is performed, wherein measuring points that encode a position of the further reference element are produced during the further rotary movement, but in particular during a further following movement that is performed by the sensor of the coordinate measuring machine, wherein, in the determining step, the relative position of the axis of rotation of the rotary table is determined in dependence on the measuring points produced during the rotary movements.

The measuring points in the further measuring step are produced by probing or scanning the further reference element. The further following movement may be performed in particular in such a way that the at least one further reference element is arranged in the range of detection of the sensor during the further rotary movement.

The statements made with respect to the first measuring step apply here correspondingly to the further measuring step, in particular with respect to the rotary and/or following movements carried out in the measuring steps. In particular, the production of measuring points during the further following movement may take place when the further rotary movement of the rotary table is performed or when the sensor is at a standstill.

In particular, a trajectory of the reference element during the further rotary movement may be different from the trajectory of the previously explained first rotary movement. For example, at least one parameter of the circular movement of the further reference element during the further rotary movement, for example a radius and/or a rotational speed, may be different from the corresponding parameter of the circular movement of the first reference element during the first rotary movement. Different radii result in a constant angular velocity in different path velocities. Preferably, the angular velocity of the rotary movement is reduced with increasing radius. Preferably, the angular velocity is chosen here in such a way that a path velocity is not greater than a predetermined threshold value, since path velocities that are too high can reduce an accuracy of the determination.

This advantageously results in an increase in the number of measuring points produced, wherein it is likewise ensured that they are produced as independently from one another as possible, in particular on different trajectories. As a result, an accuracy of the determination of the relative position can be improved. In particular, it is possible that this reduces effects dependent on the angular velocity in the proposed determination of the relative position. Thus, specifically, the relative position of the axis of rotation may also be dependent on an angular velocity of the rotary movement, for example if tilting moments act on the rotary table due to a workpiece arranged on the rotary table.

In a further embodiment, a height of the further reference element (and consequently also of a reference point possibly established by the reference element) above the rotary table is different from a height of the first reference element above the rotary table. Alternatively or additionally, a radial distance of the further reference element (and consequently also of a reference point possibly established by the further reference element) from the axis of rotation is different from the radial distance of the first reference element from the axis of rotation. This advantageously results in the robustness in the determination of the relative position being increased, in particular in the case of rotary tables with a small diameter.

In particular, the previously explained circle fitting may be carried out in each case for the measuring points produced at different heights. The straight line described by the midpoints of the circles at different heights can describe the relative position of the axis of rotation. Given ideal components without measuring errors, the same direction vector for the axis of rotation and the same relative position would always be obtained. The previously explained normal to the plane may have different values for each of the circles determined in this way on account of different axis errors and measuring errors. An averaging of the respectively determined orientation increases the accuracy here, and the deviations of the individual values from one another can form a quality criterion.

Also, the explained circle fitting at different heights allows a height-dependent relative position of the axis of rotation to be determined. This makes it possible during later measuring to take account of the relative position of the axis of the rotary table in a way dependent on the measuring height, and consequently to transform it into the workpiece coordinate system in a way dependent on the measuring height.

If measuring points are produced with reference elements that are arranged at different heights above the rotary table, but with equal radial distances from the axis of rotation, properties of a cylinder can be determined in such a way that a distance of the measuring points produced from the cylinder, in particular the lateral surface of the cylinder, is minimal. This may also be referred to as cylinder fitting. Then, the relative position of the axis of rotation can be determined as the relative position of the middle line of the cylinder.

If measuring points are produced with reference elements that are arranged at different heights above the rotary table and with unequal radial distances from the axis of rotation, properties of a cone can be determined in such a way that a distance of the measuring points produced from the cone, in particular the lateral surface of the cone, is minimal. This may also be referred to as cone fitting. Then, the relative position of the axis of rotation can be determined as the relative position of the middle line of the cone.

Also proposed is an apparatus for determining a relative position of an axis of rotation of a rotary table of a coordinate measuring machine. The apparatus is in this case formed or configured in such a way that a method according to one of the embodiments described in this disclosure can be carried out by the apparatus.

In particular, the apparatus comprises at least one control and evaluation device. Here, the control and evaluation device may be a device for data processing. This may be formed as or comprise a microcontroller or an integrated circuit. Furthermore, the control and evaluation device is formed in such a way as to control a rotary movement of the rotary table in an open-loop manner, wherein measuring points that encode a position of the reference element, in particular a reference point of the reference element, can be produced by the sensor during this rotary movement. Furthermore, the control and evaluation device is formed in such a way as to determine the relative position of the axis of rotation of the rotary table in a determining step in dependence on the measuring points produced. This allows the previously described method to be advantageously performed with the apparatus, corresponding advantages already having been explained.

Furthermore, the control and evaluation device may be formed in such a way that a following movement of a sensor of the coordinate measuring machine can be controlled in an open-loop manner, wherein measuring points can be produced by the sensor during this following movement.

Further, the apparatus may comprise the reference element. Further, the apparatus may comprise the rotary table. Furthermore, the apparatus may also comprise the coordinate measuring machine or parts thereof.

Also proposed is a rotary table for a coordinate measuring machine, wherein the rotary table has or forms at least one first reference element. In addition, the rotary table may have or form at least one further reference element. The reference element(s) is/are arranged eccentrically in relation to the axis of rotation of the rotary table.

A reference element may in this case be fastened on a surface of an upper side of the rotary table or on a side or peripheral surface or a surface of an underside of the rotary table, in particular of the face plate, or be integrated in these surfaces, in particular in such a way that a reference element does not protrude or project from the surface. This can advantageously achieve the effect that a measurement object to be measured can be arranged on the surface of the rotary table without the reference element having to be removed from the rotary table in a time-consuming way.

Also, a reference element may also be fastened to the rotary table in such a way that a reference point established by the reference element is arranged at a predetermined height above the surface of the rotary table and/or at a predetermined radial distance from a midpoint of the rotary table.

The reference element may also be arranged at the rotary table or integrated in it in such a way that the probing/scanning of the reference element for determining the relative position of the axis of rotation is also possible when a measurement object to be measured is arranged on the surface of the rotary table. As a result, it is advantageously not necessary to remove the measurement object for determining the relative position of the axis of rotation. Furthermore, changes of the relative position determined according to the invention on account of the additional gravitational force of the measurement object can also be avoided.

The reference element can be optically probed/scanned. Alternatively, the reference element has a centering element or is formed as a centering element. The centering element may be in particular a self-centering centering element. A self-centering reference element has already been previously explained.

In particular, the centering element may be formed in such a way that a centering volume is established by the centering element, wherein the centering volume is established in such a way that, when a tactile sensor, in particular a probe, more in particular a probe ball of the probe, is inserted into the centering volume along a direction of insertion, the tactile sensor is moved into a reference position established by the formation of the centering element. For example, during the insertion into the centering volume, a probe ball of a probe may be deflected in such a way that a midpoint of the probe ball is arranged on a central middle line of the centering volume. Furthermore, the centering element may be formed in such a way that, depending on the radius, the probe ball of a probe on insertion into the centering volume can only be moved along the direction of insertion up to the end position established by the formation of the reference element (reference position). The direction of insertion may in this case be parallel to the central middle line and oriented from an outer volume around the centering volume by an insertion portion of the centering volume into the latter, in particular up to the end position.

In other words, the centering element may be arranged and/or formed in such a way that a definite and possibly radius-dependent probing point is established by the formation. This allows exactly this probing point to be repeatedly probed/scanned in multiple probing operations. The identification of such a probing point may take place for example force-dependently, in particular when a probing force is greater than a predetermined threshold value. Alternatively or additionally, such a probing point may be identified deflection-dependently, that is to say when the deflection of the probe is less than or greater than a predetermined threshold value or lies in a predetermined range of deflection values.

The reference element(s) may in this case be detachably fastened to the rotary table. This advantageously results in a rotary table that allows an easy, reliable and accurate determination of the relative position of its axis of rotation. Methods for determining this relative position have already been explained previously.

Consequently, the rotary table advantageously serves for carrying out a method according to one of the embodiments described in this disclosure.

In a further embodiment, the centering element is formed as a centering bore. A centering bore may in this case comprise in particular a conical or partially conical portion or be formed as a cone or part of a cone. It goes without saying that a centering bore may also be of a pyramidal or frustopyramidal form or comprise a correspondingly formed portion. Such a pyramid may have in particular a face with three corners, four corners or more than four corners. It goes without saying, however, that further formations of a centering bore are also conceivable, in particular in such a way that a maximum dimension, for example a diameter or a width, decreases along a central middle line of the centering bore, at least in a portion of the centering bore.

The centering bore may in this case be a bore in the rotary table. Alternatively, the centering bore may be a bore in a reference element that is fastened to the rotary table.

Alternatively, the centering element may be formed as a three-point or multi-point bearing. A three-point or multi-point bearing may in this case comprise for example three or more balls or pairs of balls. Such a three-point bearing is described for example in U.S. Pat. No. 4,153,998. There it is described that a so-called V bearing can be formed by balls or rollers. In particular, a three-point bearing may comprise a ball triplet or roller triplet. A multi-point bearing may correspondingly comprise more than three balls or rollers. Elements of the bearing, that is to say in particular balls or rollers, are preferably of a mechanically hard design.

The three-point or multi-point bearing may be formed in particular in such a way that contact points or linear contact portions in which the elements are in contact lie on the lateral surface of a cone with a predetermined cone angle.

A three-point bearing may be formed in particular in such a way that three balls with the same diameter are arranged in the form of an equilateral triangle, for example are fastened to a carrier element, such as for example a plate, wherein the midpoints of the balls form the corners of the triangle. When a probe ball is used, a definite relative position is obtained by just three contact points. Correspondingly, three roller bodies may be arranged in such a way that the middle lines of the rollers are arranged in the plane of the lateral surface of a cone, wherein points of intersection of the middle lines with a plane that is oriented perpendicularly to the axis of symmetry of the cone can form corners of an equilateral triangle.

This advantageously has the effect that the reference element can be easily produced, wherein a probing point is reliably established by the reference element, in particular for a probe with a probe ball.

In a further embodiment, the reference element is formed as a groove or comprises a groove. The groove may be formed in particular as an annular groove. A middle line of the groove may in this case follow a path in the form of an arc of a circle or a full circle. Alternatively, the groove may also extend in a radial direction.

The groove may in particular be arranged at/in an upper side of the rotary table or at/in an underside of the rotary table. Edges of the groove may be formed in a beveled or rounded manner. It is also possible that there are arranged in the groove, in particular on a bottom surface of the groove, toroidal elements with a circular cross section, such as for example rollers, for centering a tactile sensor. It is also conceivable to arrange a multiplicity of balls on the bottom surface of the groove, in particular lying against one another.

This advantageously has the effect that the reference element can be reliably probed in any angular position in a rotary movement, whereby time expended for producing measuring points can be further reduced.

Also proposed is a coordinate measuring machine, wherein the coordinate measuring machine comprises a rotary table according to one of the embodiments described in this disclosure and/or an apparatus for determining a relative position of an axis of rotation of a rotary table of a coordinate measuring machine according to one of the embodiments described in this disclosure. This advantageously results in a coordinate measuring machine with which a relative position of an axis of rotation of a rotary table with respect to the workpiece holder can be determined quickly, reliably and accurately.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The invention is explained in more detail in the context of example embodiments. In the figures.

Identical reference signs hereinafter designate elements having identical or similar technical features.

DETAILED DESCRIPTION

Figure 1:
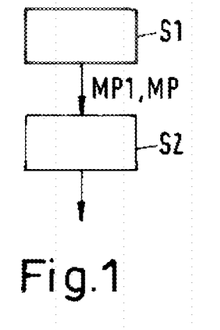
FIG. 1 shows a schematic flow diagram of a method according to the invention in a first embodiment.
Figure 5:
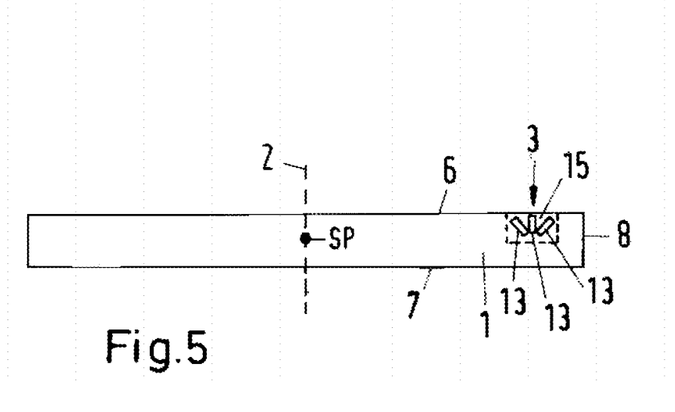
FIG. 5 shows a schematic cross section through a rotary table in a first embodiment.

FIG. 1 shows a schematic flow diagram of a method according to the invention for determining a relative position of an axis of rotation 2 of a rotary table 1 (see FIG. 5). The rotary table 1 has a reference element 3, or forms it, wherein the reference element 3 is arranged eccentrically in relation to the axis of rotation 2.

In a measuring step S1, a rotary movement of the rotary table 1 is performed, in particular with predetermined movement properties, in particular a predetermined rotational acceleration and a predetermined rotational speed or predetermined variations over time of the variables mentioned. Furthermore, in the measuring step S1, a following movement of a sensor 4 of a coordinate measuring machine 5 (see for example FIG. 10) is performed. During the rotary movement of the rotary table 1, the reference element 3 moves along a circular path. The trajectory covered during the rotary movement may be a trajectory in the form of a full circle or in the form of an arc of a circle.

The following movement of the sensor 4 may be performed in particular in such a way that the reference element 3, in particular a reference point of the reference element 3, is located in the range of detection of the sensor 4 during the rotary movement.

The following movement and the rotary movement may be performed at the same time.

Furthermore, measuring points MP that encode a position of the reference element 3 or of the reference point, in particular in a machine coordinate system (see FIG. 10), are produced by the sensor 4 during the following movement in the measuring step S1. In particular, the measuring points MP produced during the following movement may also be produced during the rotary movement of the rotary table 1. FIG. 1 shows that measuring points MP of a first set MP1 of measuring points MP are produced in the first measuring step S1.

In a determining step S2, a relative position of the axis of rotation 2, in particular an orientation, and the relative position of a supporting point SP of the rotary table 1 can then be determined in dependence on the measuring points MP produced. Consequently, after carrying out the determining step, information about the relative position of the axis of rotation 2 can be output, for example to a user or to a higher-level system.

Figure 2:
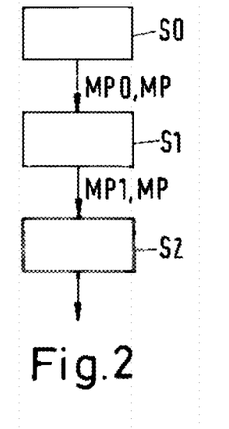
FIG. 2 shows a schematic flow diagram of a method according to the invention in a further embodiment.

FIG. 2 shows a schematic flow diagram of a method according to the invention in a further embodiment. Here, the steps represented in FIG. 2, specifically measuring step S1 and the determining step S2, correspond to the steps S1, S2 represented in FIG. 1, whereby reference is made to the corresponding statements made with respect to FIG. 1.

In addition, before the measuring step S1, an approximate relative position determining step S0, which serves for determining an approximate relative position of the axis of rotation 2 of the rotary table 1 (see FIG. 5), may be carried out. However, this approximate relative position determining step is optional. In particular, the approximate relative position may also be already known.

Figure 10:
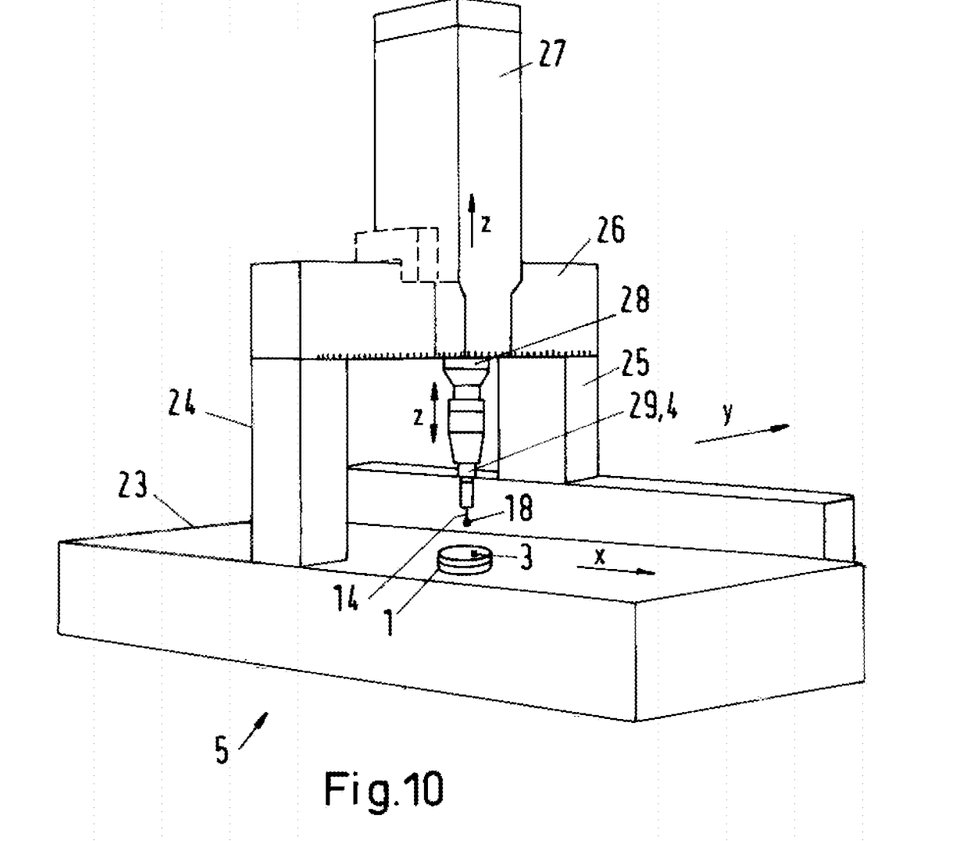
FIG. 10 shows a schematic view of a coordinate measuring machine according to the invention.

In particular, in the approximate relative position determining step S0, a probing/scanning of the rotary table 1 may be carried out with the sensor 4 of the coordinate measuring machine 5 (see FIG. 10). It is possible for example to produce measuring points MP from an upper side 6 of the rotary table 1 or from an underside 7 of the rotary table 1 by probing. It is also possible to produce measuring points from an end face 8 of the rotary table, wherein the end face 8 is formed by a lateral surface of a cylindrical or substantially cylindrical rotary table 3. The upper side 6 may in this case form the bearing surface for holding a workpiece (not represented).

In dependence on the measuring points MP produced in such a way, an approximate relative position of the axis of rotation 2 can then be determined. In dependence on the information about this approximate relative position and in dependence on already known information about the arrangement of the reference element 3 in relation to the axis of rotation 2 and also in dependence on information about the rotational speed, the following movement can then be controlled in an open-loop manner.

For example, the approximate orientation of the axis of rotation 2 may be determined in dependence on measuring points MP that have been produced during scanning of the upper side 6 or the underside 7. The approximate relative position of a supporting point SP of the axis of rotation 2 may be determined in particular in dependence on measuring points MP that have been produced during a scanning of the end face 8 of the rotary table 1.

At a time before carrying out the rotary movement and following movement, it may be required to probe the reference element 3, in particular once, when the rotary table 1 is at a standstill, for example in order to determine an approximate relative position of the reference element 3, which can then be taken into account for determining information about the approximate arrangement of the reference element 3 in relation to the axis of rotation 2.

Figure 3:
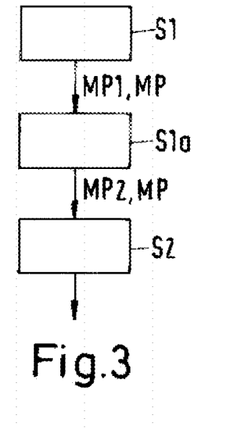
FIG. 3 shows a schematic flow diagram of a method according to the invention in a further embodiment.

FIG. 3 shows a schematic flow diagram of a method according to the invention in a further embodiment. Here, the measuring step S1 corresponds to the measuring step S1 represented in FIG. 1, whereby reference is made to the corresponding statements made with respect to FIG. 1. In a further measuring step S1a, a further rotary movement of the rotary table 1 is performed.

Furthermore, in the further measuring step S1a, a further following movement of a sensor 4 of the coordinate measuring machine 5 (see FIG. 10) is performed, wherein a further set MP2 of measuring points MP that encode a position of a further reference element, in particular a reference point of the further reference element, during the further rotary movement is produced during the further following movement.

The rotary table 1 may in this case have or form the further reference element. It is also possible that, before carrying out the further measuring step S1a, this at least one further reference element is arranged at the rotary table 1. Once the reference element 3 (see FIG. 5), which serves for producing measuring points MP in the first measuring step S1, has for example been detachably fastened to the rotary table 1, before carrying out the further measuring step S1a, it can be detached from the rotary table 1 and arranged at the rotary table 1 in a different relative position in relation to the rotary table 1, for example with a smaller or greater radial distance from the axis of rotation 2. Also, the further reference element may be arranged at a different height above the rotary table 1, wherein the height may refer to a distance from an upper side 6 of the rotary table 2 along a height direction, which is oriented parallel to the axis of rotation 2 and away from the upper side 6 and not toward the underside 7.

In the determining step S2, the relative position of the axis of rotation 2 of the rotary table 1 is then determined in dependence on the measuring points MP produced during the first measuring step S1, that is to say the measuring points MP of the first measuring point set MP1 and also the measuring points MP of the further measuring point set MP2. In this case, the orientation and the relative position of a supporting point SP of the axis of rotation 2 may be determined independently of one another for each of the measuring point sets MP1, MP2, wherein a resultant relative position, in particular a resultant orientation and a resultant position of a supporting point SP, is then determined in dependence on these two relative positions determined independently of one another, for example by a suitable fusion, for example an averaging. Also, the measuring points MP of all of the measuring point sets MP1, MP2 may be combined in a common set, wherein then the orientation and the relative position of a supporting point SP of the axis of rotation 2 is determined in dependence on the measuring points MP of this resultant set, for example by the previously explained cylinder fitting.

Figure 4:
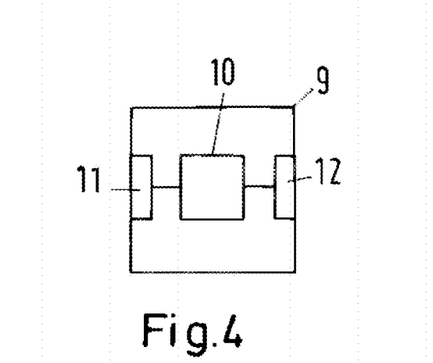
FIG. 4 shows a schematic block diagram of an apparatus according to the invention.

FIG. 4 shows a schematic block diagram of an apparatus 9 according to the invention for determining a relative position of an axis of rotation 2 of a rotary table 1 of a coordinate measuring machine 5 (see FIG. 5 and FIG. 10). The apparatus 9 comprises at least one control and evaluation device 10, which may be formed in particular as an apparatus for data processing, more in particular as a computing device. This may be formed as a microcontroller or an integrated circuit or comprise such a microcontroller or integrated circuit.

The apparatus 9 also comprises an input interface 11 for the input of input information, in particular measuring points MP. The apparatus 9 also comprises an output interface 12, for the output of information about the relative position of the axis of rotation 2 of the rotary table 1. Furthermore, the output interface 12 may also serve for the output of control commands that are produced by the control and evaluation device 10. The control and evaluation device 10 is formed here in such a way that a method according to one of the embodiments described in this disclosure can be carried out, in particular corresponding control commands can be produced and corresponding evaluation steps can be carried out. The control and evaluation device 10 and also the input and output interfaces 11, 12 may in this case be connected in terms of signaling and/or data technology.

FIG. 5 shows a schematic cross section through a rotary table 1 for a coordinate measuring machine 5 (see FIG. 10). The rotary table 1 has in this case a reference element 3. The reference element 3 represented in FIG. 5 is formed here as a centering element. In particular, the reference element 3 formed as a centering element comprises a centering three-point bearing. The three-point bearing represented comprises three rollers 13, which are of a cylindrical form and the central longitudinal axes of which are oriented obliquely in relation to one another and intersect at a common point of intersection. If a tactile sensor, in particular a probe 14 (see FIG. 6) with a probe ball 18 (see FIG. 7), is inserted into the centering volume 15 enclosed by the reference element, for example from an upper side 6 of the rotary table 1, the probe ball 18 is deflected by the formation and arrangement of the rollers 13 in such a way that a midpoint of the probe ball 18 is arranged on a central middle line of the centering volume 15. In addition, depending on its radius, the probe ball 18 will butt against the rollers 13 with its spherical surface during the movement into the centering volume 15, wherein, in the state in which the probe ball 18 is lying against all of the rollers 13 simultaneously and the midpoint of the probe ball 18 is arranged on the central middle line of the centering volume 15, a definite probing point, and consequently reference point of the reference element 3, is established, the position of the reference point being dependent on the radius of the probe ball 18.

The definite probing point may in this case correspond to the relative position of the midpoint of the probe ball 18 in this state. In renewed probing, this probing point can be probed reproducibly, that is to say reliably in different probing operations.

Figure 6:
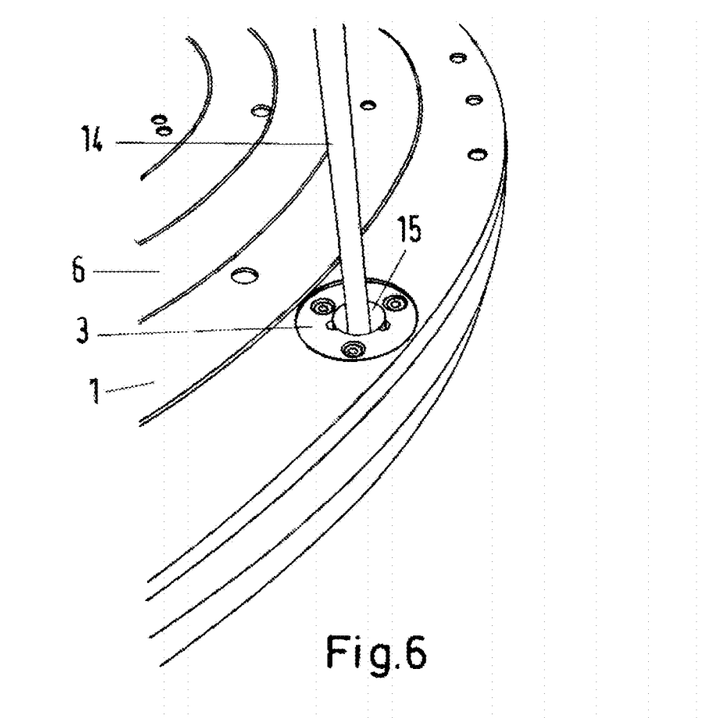
FIG. 6 shows a perspective representation of a rotary table according to the invention and a tactile sensor.

FIG. 6 shows a schematic perspective representation of a rotary table 1 with a reference element 3 that is formed in a way corresponding to the embodiment represented in FIG. 5.

Also represented is a probe 14 of a tactile sensor 4 of a coordinate measuring machine 5 (see FIG. 10). It is shown that the reference element 3 is arranged at an upper side 6 of the rotary table 1. It is also shown that the probe 14 is arranged with a probe ball 18, arranged at its free end (see FIG. 7), in the centering volume 15 of the reference element 3, whereby the reference element 3 is located in the range of detection of the sensor 4. The reference element 3 is in this case integrated in the rotary table 1, in particular in such a way that it is arranged under the surface of the upper side 6 (see FIG. 5) and the upper side of the reference element 3 is flush with the upper side 6 of the rotary table 1.

Figure 7:
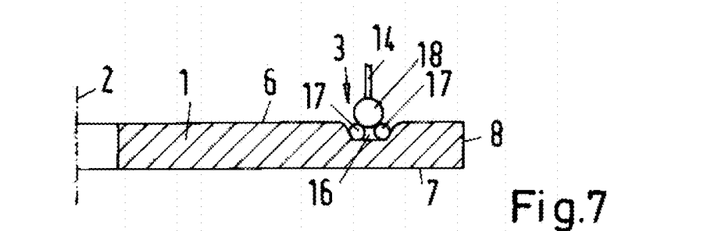
FIG. 7 shows a schematic cross section through a rotary table according to the invention in a further embodiment.

FIG. 7 shows a schematic cross section through a rotary table 1 according to a further embodiment according to the invention. Shown is a reference element 3 formed as a groove 16, wherein the groove 16 is formed as a depression in an upper side 6 of the rotary table 1. The groove 16 may be a peripheral groove 16 with respect to the rotary table 1. It is also shown that there are arranged in the groove 16 balls 17, which form a centering effect for a probe 14 with a probe ball 18 of a tactile sensor. The balls 17 may be arranged here in particular on a bottom surface of the groove 16.

Figure 8:
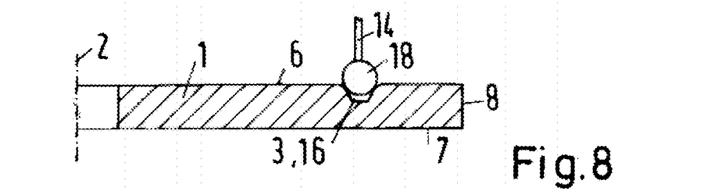
FIG. 8 shows a schematic cross section through a rotary table according to the invention in a further embodiment.

FIG. 8 shows a schematic cross section through a rotary table 1 according to a further embodiment of the invention. Shown again is a groove 16, which is formed as a depression in the region of an upper side 6 of the rotary table 1. The groove 16 has curved or rounded side walls, which produce a centering effect for a probe ball 18 of a probe 14 of a coordinate measuring machine 5 (see FIG. 10) during the probing.

Figure 9:
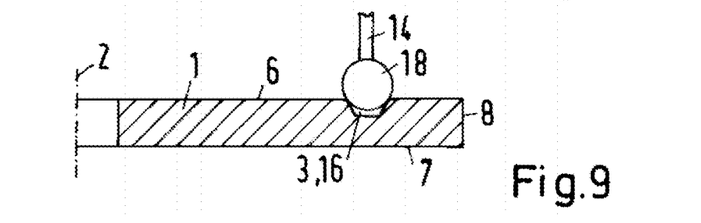
FIG. 9 shows a schematic cross section through a rotary table according to the invention in a further embodiment.

FIG. 9 shows a cross section through a rotary table 1 according to a further embodiment of the invention. As a difference from the embodiment represented in FIG. 8, the groove 16 has beveled side walls or side walls formed as bevels. These may also advantageously produce a centering effect for a probe ball 18 of a probe 14 during the probing.

FIG. 10 shows a schematic representation of a coordinate measuring machine 5 of a gantry type of construction. This machine has a measuring table 23, over which columns 24, 25 are arranged, wherein these columns 24, 25 are arranged movably along a longitudinal axis x of a machine coordinate system. Together with a crossbeam 26, the columns 24, 25 form a gantry of the coordinate measuring machine 5. At its opposite ends, the crossbeam 26 is connected to the columns 24, 25. Drive devices not shown in any more detail, for example electric motors, may cause the linear movement of the columns 24, 25 in and counter to the longitudinal direction represented, which is symbolized by an arrow of the longitudinal axis x. Mounted on the crossbeam 26 is a carriage 27, which can be moved along a transverse axis y of the machine coordinate system. This movement can also be produced by a drive device that is not represented.

A quill 28 is movably mounted on the carriage 27, wherein this quill can be moved along a vertical axis z of the machine coordinate system. This movement may likewise be produced by a drive device that is not represented. Arranged at a free end of the quill 28 is a measuring head 29, wherein the measuring head is a tactile measuring head. The tactile measuring head 29 comprises a probe 14 with a probe ball 18. The explained mobility of the component parts of the coordinate measuring machine 5, specifically the columns 24, 25, the carriage 27 and also the quill 28, also allow the probe 14 with the probe ball 18 to be moved in the measuring volume of the coordinate measuring machine 5. In particular, the following movement can be carried out by a corresponding movement of the movable component parts.

The open-loop or closed-loop control of the drive devices may take place here by the control and evaluation device 10 represented in FIG. 4.

Figure 11:
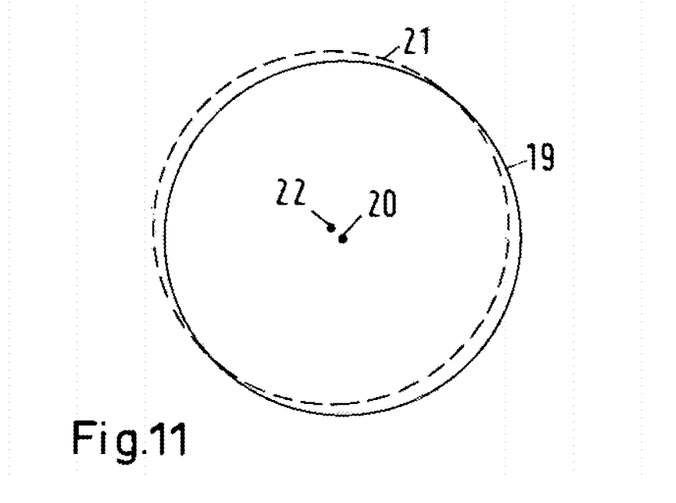
FIG. 11 shows a schematic trajectory of a reference element during a rotary movement of a rotary table.

FIG. 11 shows a schematic trajectory 19 of a reference element 3 during a rotary movement of a rotary table 1 (see FIG. 5). Apart from the trajectory 19, also shown is a midpoint 20 of the trajectory 19, which forms a supporting point SP along the axis of rotation 2 of the rotary table 1.

Also schematically represented is a trajectory 21 of a following movement and also a midpoint 22 of this trajectory 21. It is evident that the trajectory 21 of the following movement, in the form of a circular path, deviates in its relative position from the trajectory 19, in the form of a circular path, of the rotary movement of the reference element 3. However, the deviation is so small that the reference element 3 is in the range of detection of the sensor 4 of the coordinate measuring machine 5 during the preferably simultaneous performances of the rotary movement and following movement. In particular, the reference element can consequently be probed by a probe 14 (see for example FIG. 6) of a tactile sensor 4 of the coordinate measuring machine 5. However, this may have the effect that the probe 14 is deflected out of an undeflected intended relative position for the probing.

The phrase at least one of A, B, and C should be construed to mean a logical (A OR B OR C), using a non-exclusive logical OR, and should not be construed to mean "at least one of A, at least one of B, and at least one of C."

LIST OF REFERENCE SIGNS

1 Rotary table
2 Axis of rotation
3 Reference element
4 Sensor
5 Coordinate measuring machine
6 Upper side
7 Underside
8 End face
9 Apparatus
10 Control and evaluation device
11 Input interface
12 Output interface
13 Rollers
14 Probe
15 Centering volume
16 Groove
17 Ball
18 Probe ball
19 Trajectory of the rotary movement
20 Midpoint
21 Trajectory of the following movement
22 Midpoint
23 Measuring table
24 Column
25 Column
26 Crossbeam
27 Carriage
28 Quill
29 Measuring head
S1 First measuring step
S2 Determining step
S1a Further measuring step
MP Measuring point
MP1 First set of measuring points
MP2 Second set of measuring points
MP0 Further set of measuring points

What is claimed is:

1. A method for determining a relative position of an axis of rotation of a rotary table of a coordinate measuring machine, wherein the rotary table has or forms a reference element that is arranged eccentrically in relation to the axis of rotation, the method comprising:
    a measuring step including:
        performing a rotary movement of the rotary table, and
        producing measuring points that encode a position of the reference element by a sensor of the coordinate measuring machine during the rotary movement; and
    a determining step including determining the relative position of the axis of rotation of the rotary table based on the measuring points.

2. The method of claim 1, further comprising:
    performing a following movement of a sensor of the coordinate measuring machine,
    wherein at least some of the measuring points are produced by the sensor during the following movement.

3. The method of claim 2, wherein at least part of the rotary movement and at least part of the following movement overlap in time.

4. The method of claim 2, wherein a movement trajectory of the following movement is determined based on at least one of (i) an approximate relative position of the axis of rotation and (ii) the measuring points that have been produced during the rotary movement of the rotary table.

5. The method of claim 4, further comprising:
    an approximate relative position determining step including probing/scanning of the rotary table using the sensor; and
    determining the approximate relative position based on the measuring points produced in the approximate relative position determining step.

6. The method of claim 2, wherein:
    the sensor is a tactile sensor, and
    the sensor produces a force while at least one of (i) no force is produced in directions different from an intended probing direction, or (ii) a force different from zero is produced in a direction tangential to a trajectory of the following movement.

7. The method of claim 2, wherein the at least some of the measuring points are only produced when an amount of an acceleration of the following movement is less than a predetermined threshold value.

8. The method of claim 1, wherein:
    the reference element is a tactile reference element, and a probing position of a tactile sensor is definitely established by the a formation of the tactile reference element.

9. The method of claim 1, wherein the rotary movement causes either:
    less than one full revolution of the rotary table, or
    exactly N full revolutions of the rotary table, wherein N is an integer greater than or equal to one.

10. The method of claim 1, wherein:
    a direction of rotation of the rotary movement is changed, and
    the measuring points are produced during the rotary movement with a first direction of rotation and during a second rotary movement with a second direction of rotation that is different from the first direction of rotation.

11. The method of claim 1, wherein the measuring points are only produced in predetermined portions of the rotary movement.

12. The method of claim 11, further comprising performing a following movement of a sensor of the coordinate measuring machine along a trajectory, wherein at least some of the measuring points are produced by the sensor during the following movement, and wherein a total number of the measuring points produced in overlapping portions of the trajectory of the following movement is reduced.

13. The method of claim 1, wherein:

the rotary movement is carried out in partial movements following one another in time, and the rotary movement is stopped at the end an end of each partial movement.

14. The method of claim 1, wherein:

a further reference element is at least one of (i) formed by the rotary table and (ii) arranged at the rotary table, the method comprises a further measuring step including performing a further rotary movement of the rotary table, and producing second measuring points that encode a position of the further reference element during the further rotary movement, and p1 the determining step includes determining the relative position of the axis of rotation of the rotary table based on the measuring points and the second measuring points.

15. The method of claim 14, wherein at least one of:

a height of the further reference element above the rotary table is different than a height of the reference element above the rotary table, and a radial distance of the further reference element from the axis of rotation is different than a radial distance of the reference element from the axis of rotation.

16. An apparatus for determining a relative position of an axis of rotation of a rotary table of a coordinate measuring machine, the apparatus comprising:

a control and evaluation device configured to control a rotary movement of the rotary table; and a sensor configured to produce measuring points that encode a position of a reference element of the rotary table during the rotary movement, wherein the control and evaluation device is configured to determine the relative position of the axis of rotation of the rotary table based on the measuring points.

17. The apparatus of claim 16, wherein:

the control and evaluation device is configured to control a following movement of a sensor of the coordinate measuring machine, and at least some of the measuring points are produced by the sensor during the following movement.

18. A coordinate measuring machine comprising the apparatus of claim 16.

19. A rotary table for a coordinate measuring machine, the rotary table comprising:

a rotating coupling defining an axis of rotation; and a reference element that is arranged eccentrically in relation to the axis of rotation, wherein the reference element at least one of (i) is configured to be optically probed/scanned and (ii) has a centering element or is formed as a centering element, wherein the reference element is configured to be measured to generate measuring points, and wherein the measuring points represent point coordinates of the reference element or coordinates of points of the reference element in a machine coordinate system.

20. The rotary table of claim 19, wherein the centering element is formed as a centering bore or is formed as a three-point or multi-point bearing.

21. The rotary table of claim 19, wherein the reference element is formed as a groove or comprises a groove.

22. The rotary table of claim 19, wherein the reference element is formed as a roller triplet.

23. The rotary table of claim 19, wherein the reference element is at least one of:

coupled to an upper side of the rotary table in a non-protruding manner and integrated in a surface of the upper side of the rotary table, wherein the integrated reference element does not protrude above the surface.

24. The rotary table of claim 19, wherein the reference element is at least one of coupled to and integrated in a peripheral surface of the rotary table.

25. The rotary table of claim 19, wherein the reference element is at least one of coupled to and integrated in a surface of an underside of the rotary table.

* * * * *

UNITED STATES PATENT AND TRADEMARK OFFICE
CERTIFICATE OF CORRECTION

| | |
|---|---|
| PATENT NO. | : 11,592,278 B2 |
| APPLICATION NO. | : 16/906638 |
| DATED | : February 28, 2023 |
| INVENTOR(S) | : Walter Puntigam et al. |

It is certified that error appears in the above-identified patent and that said Letters Patent is hereby corrected as shown below:

In the Claims

Claim 8, Column 24, Line 48 after "and", insert --¶--

Claim 8, Column 24, Line 50 "the a formation" should be --a formation--

Claim 13, Column 25, Line 13 "the end an end" should be --an end--

Claim 14, Column 25, Line 22 "and p1" should be --and¶--

Signed and Sealed this
Eighteenth Day of April, 2023

*Katherine Kelly Vidal*

Katherine Kelly Vidal
*Director of the United States Patent and Trademark Office*